Feb. 9, 1960 W. STRAUSS 2,923,976
INJECTION MOLDING PRESS
Filed Dec. 24, 1956 6 Sheets-Sheet 6

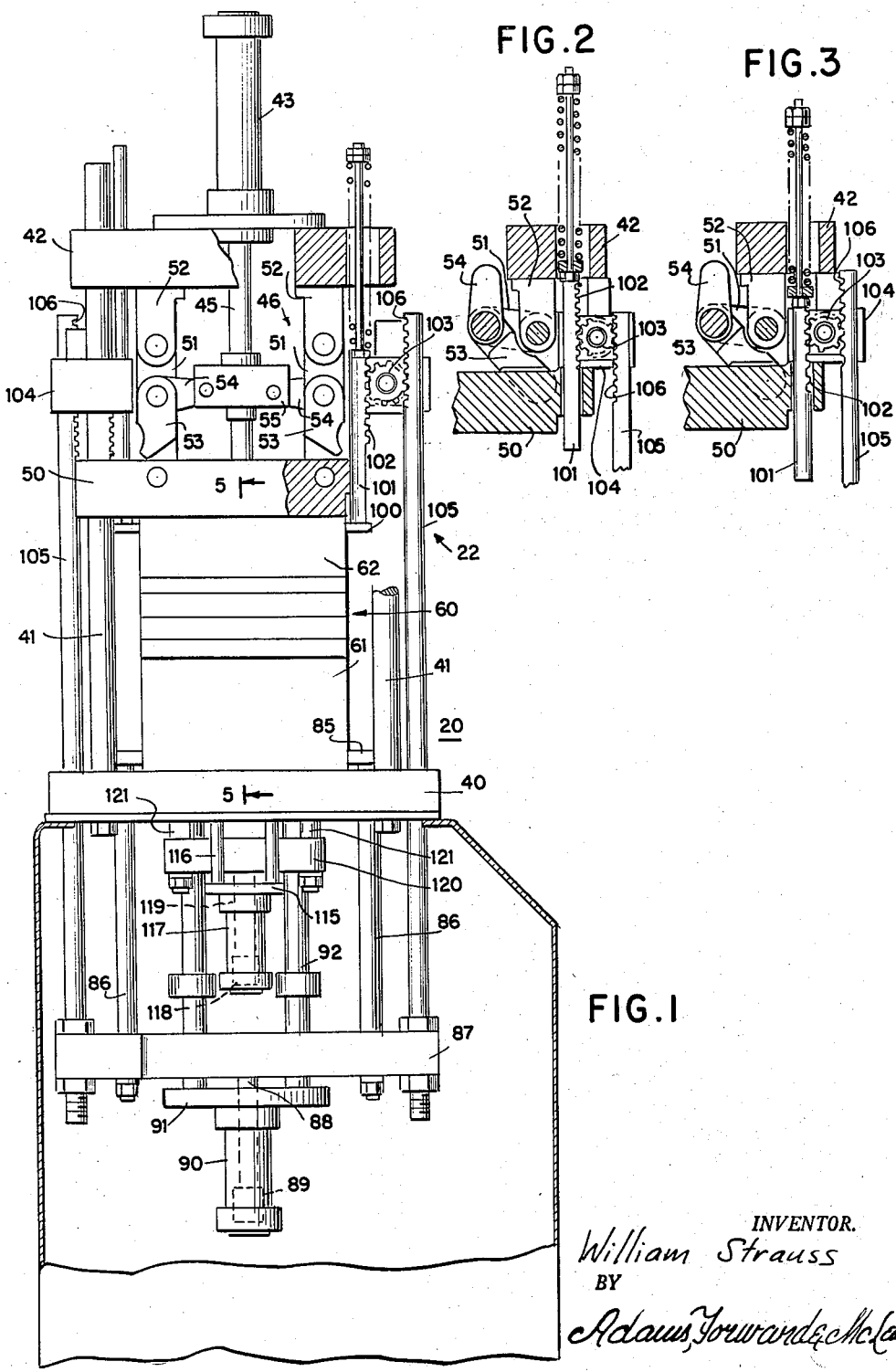

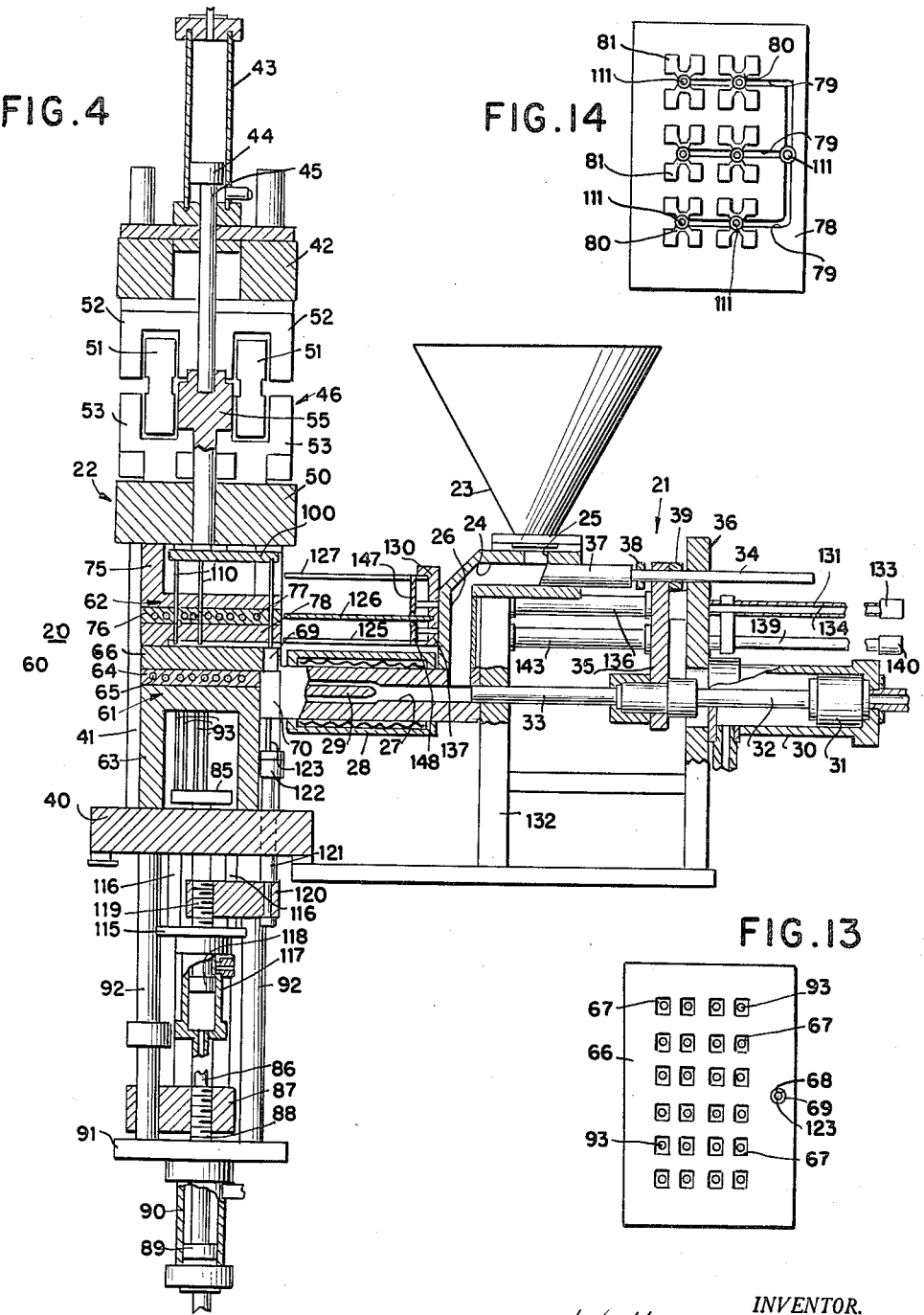

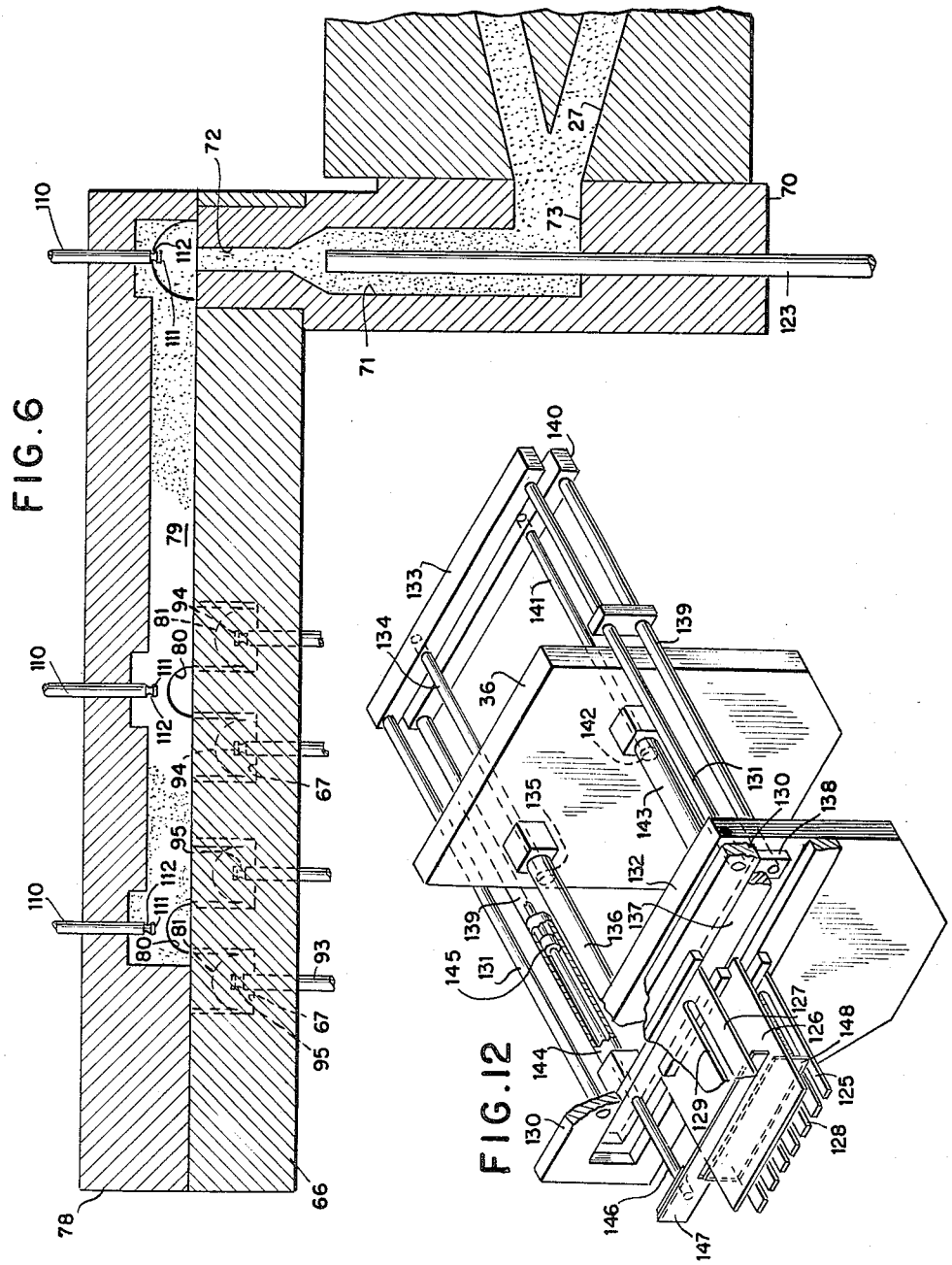

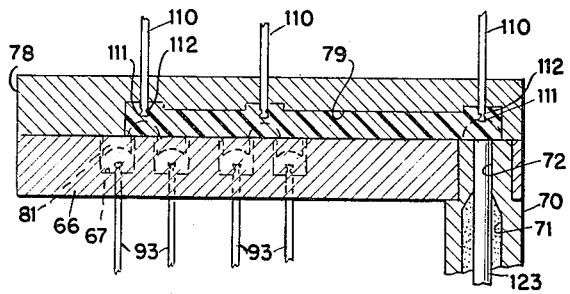
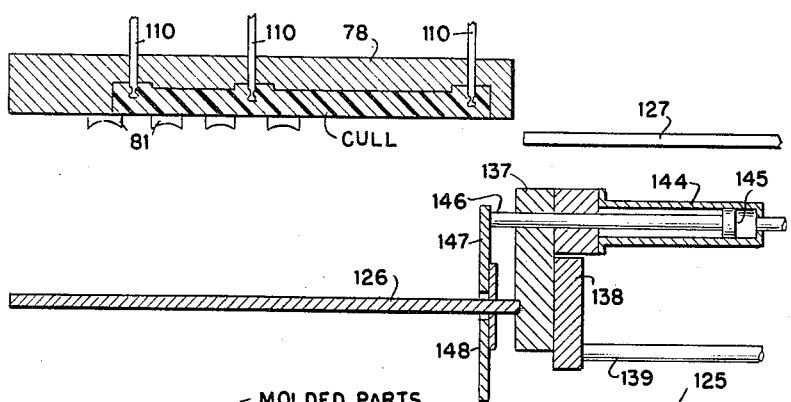
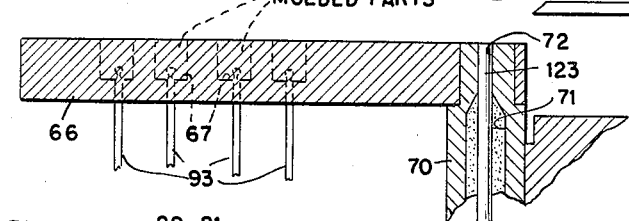
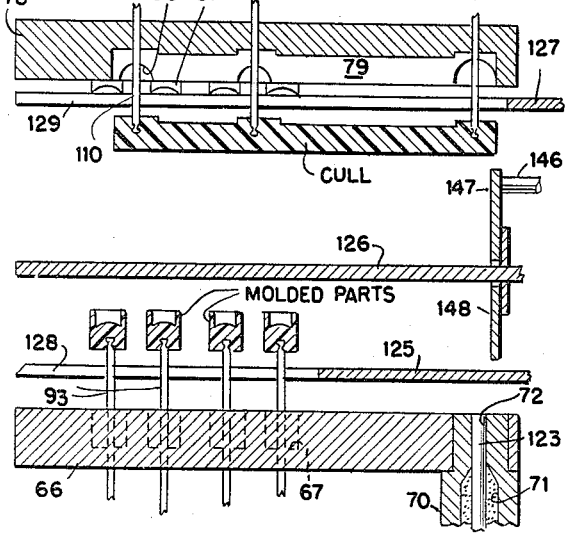

INVENTOR.
William Strauss
BY
Adams, Forward & McLean

United States Patent Office 2,923,976
Patented Feb. 9, 1960

2,923,976

INJECTION MOLDING PRESS

William Strauss, Philadelphia, Pa., assignor to E. J. Stokes Corporation, Philadelphia, Pa., a corporation of Pennsylvania Application December 24, 1956, Serial No. 630,311

2 Claims. (Cl. 18—30)

My invention relates to injection molding and in particular provides a press for injection molding of thermoplastic materials.

It is a principal object of my invention to provide an injection molding press in which the time required for an operating cycle is substantially reduced by reducing the time requirement for heating and pressuring the material to be injected, in order to render such material fluent.

It is another object of my invention to provide an injection molding press suitable for molding delicate parts in which ejection of the molded parts can be accomplished without significant breakage even of the most delicate pieces.

It is a further object of my invention to provide an injection molding press of simple construction and operating design which can usefully be employed with economic advantage in molding small charges and which requires a minimum floor space for proper installation and operation.

These and other objects of my invention which will be apparent hereinafter are effectively obtained by employing an injection mechanism, advantageously having horizontal movement, and a separately operated mold mechanism, advantageously having vertical movement, in which the injection nozzle leading from the injection mechanism into the mold is provided with a valve such that while the injected material in the mold is being set, fresh charge can be heated and worked under pressure to render it fluent and injectable. Thus, immediately upon injection of the molded pieces and reclosing the mold, the valve in the injection nozzle can be opened momentarily and a fresh charge of fluent material injected into the closed mold in a fraction of a second.

As I have indicated above, these results are advantageously achieved using a horizontal injection mechanism and a vertical mold movement. Such vertical press movement permits ejection and degating to be accomplished with collection of the molded parts separately from culls formed in the sprue and runners and permits removal of the molded parts by a horizontally moving arm onto a conveyor belt or a like located adjacent of the press such that the parts need not be dropped from the press and hence subjected to severe shock as occurs in injection molding presses having only horizontal press movements. Many features of my invention are, however, not limited in applicability to presses having vertical movements and are readily employed in horizontal presses as well.

I am aware that valving injection nozzles is not broadly new, but the prior devices of which I am aware are constructed in such a manner that recharging the injection mechanism and heating and pressuring of the charge to render it fluent cannot practically be accomplished simultaneously with setting of the injected charge.

In my copending applications Ser. Nos. 396,660, now Patent No. 2,828,507, 467,201 now Patent No. 2,878,- 515 and 513,475, now Patent No. 2,865,050, I have described a device for use in injection molding processes and a method of press operation in which solidification of culls in the sprue and runner channels is avoided by valving with a device which is seated at the die cavity in such a manner that only the molded part is solidified and the material in the sprue and runners remains heated for injection in a subsequent cycle of operation. My present invention is to be contrasted with this operation since in the present cast I provide a valve at the injection nozzle which permits the injection mechanism to be reloaded during the setting operation. The type of press in my aforenoted applications can, however, usefully be employed in the present press with significant advantage. A dual valving operation is thus contemplated.

For a more complete understanding of the principles of my present invention and for an illustration of a practical application thereof, reference is made to the appended drawings which describe an injection molding press in accordance with my present invention, and in which:

Figure 1 is a front elevational view of such a press which is partially sectioned to reveal the operative relation of certain parts;

Figure 2 is a fragmentary, sectional view of the parts shown in section Figure 1 illustrating further their operative relationship;

Figure 3 is a fragmentary, sectional view similar to Figure 2 illustrating the same parts in still another position;

Figure 4 is a side elevational view, shown partially in section, of the press shown in Figure 1;

Figure 6 is a view similar to Figure 5 illustrating the injection position in the molding cycle;

Figure 7 is a view similar to Figure 5 illustrating setting of the molded piece;

Figure 8 is a view similar to Figure 5 illustrating the mold in open position with the molded parts separated from the cull;

Figure 9 is a view similar to Figure 5 illustrating ejection of the molded parts and cull;

Figure 12 is an isometric view of the comb and collecting tray operating parts;

Figure 13 is a plan view of the top of the lower mold half as seen from line 13—13 in Figure 5; and Figure 14 is a bottom view of the upper mold half as seen from line 14—14 in Figure 5.

Figure 5:
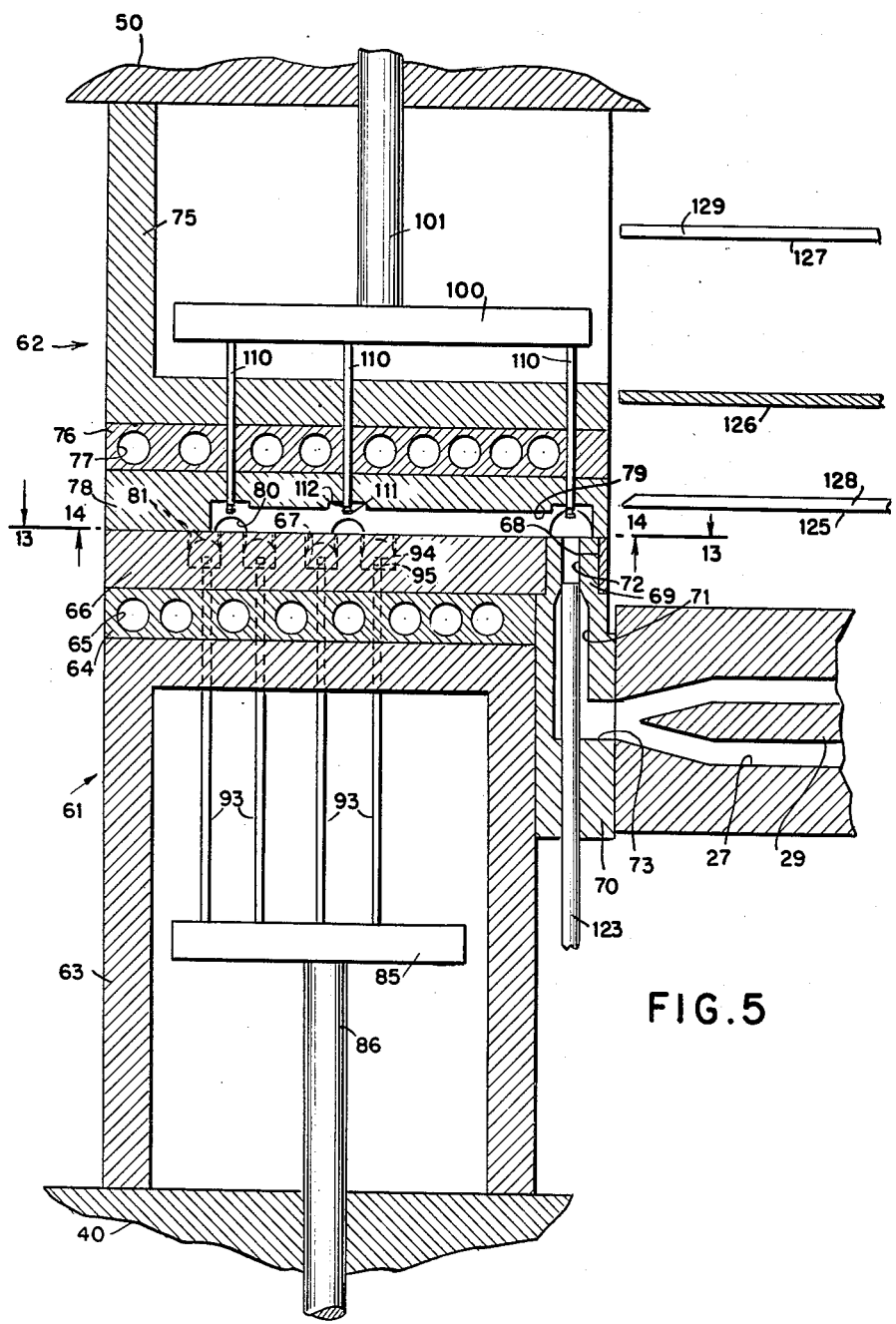
Figure 5 is a fragmentary, cross-sectional view of the press shown in Figures 1 and 4 taken along line 5—5 in Figure 1 illustrating the mold parts in position just prior to injection.

Referring more particularly to Figures 1 and 4, the reference numeral 20 designates an injection molding press constructed in accordance with my present invention. Press 20 broadly includes a horizontal injection mechanism 21 and a vertical press mechanism 22.

Referring more particularly to Figure 4, injection mechanism 21 includes a hopper 23 disposed above and connected to a horizontal feed chamber 24 by means of a vertical passage 25 such that material stored in hopper 23 can fall by gravity into chamber 24. The forward end of horizontal chamber 24 communicates with the upper end of a vertical passage 26 which at its lower end is connected to horizontal heating chamber 27 provided with an external heating mantle 28 and an internal heating torpedo 29.

To the rear (right in Figure 4) of heating chamber 27 there is mounted on press 20 a double-acting, hydraulic cylinder 30 which contains a horizontally reciprocable piston 31. A piston rod 32 affixed to piston 31 extends through the forward end of hydraulic cylinder 30 toward the rear end of heating chamber 27 and carries an injection ram 33 which enters the rear end of chamber 27. An arm 35 attached to rod 32 projects upwardly from piston rod 32 and slidably receives a piston rod 34 which extends horizontally through abutment 36 forming a portion of the frame of press 20 and on which cylinder 30 is mounted. Piston rod 34 terminates in feed piston 37 which is received in the rear end of feed chamber 24 for horizontal reciprocating movement therein. A pair of nuts 38 and 39 threadedly received on piston rod 34 are positioned on opposite sides of arm 35 to allow a degree of play between the position in which arm 35 abuts nut 38 and in which it abuts nut 39 in order to adjust the amount of horizontal movement of piston 37 as arm 35 is moved by piston rod 32.

Reciprocation of piston 31 in hydraulic cylinder 30 to a forward position simultaneously pushes a fresh charge of molding material from hopper 23 through feed chamber 24 into vertical passage 26 by means of piston 37 and stuffs a charge of molding material by means of ram 33 into heating chamber 27. A rearward stroke of piston 31 withdraws piston 37 and ram 33, thus simultaneously allowing a charge from vertical passage 26 to drop into heating chamber 27 and a fresh charge from hopper 23 to drop through passage 25 into feed chamber 24. The setting of nuts 38 and 39 is thus employed to adjust the quantity of fresh charge which is stuffed by injection mechanism 21 on each stroke, and mechanism 21 stuffs a quantity of molding material on each stroke which is in proportion to the length of the stroke. Advantageously stuffing is accomplished using a series of strokes and is in accordance with the operation described in my co-pending application Serial No. 617,383, filed October 22, 1956, now Patent No. 2,862,240.

Referring to both Figures 1 and 4, press mechanism 22 is supported on an abutment 40 above which rise four vertical tie rods 41 carrying in fixed position at their upper ends a cross head 42. A double-acting, hydraulic cylinder 43, having a vertically reciprocable piston 44 positioned therein, is mounted above cross head 42 with its piston rod 45 extending downwardly through cross head 42.

A toggle linkage 46 is employed to raise and lower a platen 50 on rods 41. Toggle linkage 46 includes four links 51, each pivotally connected at its upper end to a trunnion 52 mounted on the underside of cross head 42. Four links 53 are pivotally connected at their lower ends in the upper surface of platen 50 which is vertically reciprocable on tie rods 41 intermediate cross head 42 and abutment 40. A pair of links 54 are each pivotally connected at their outer ends to the lower ends of one pair of links 51 and to the upper ends of one pair of links 53. A block 55 is pivotally connected on each side, to the inner end of one of links 54 and is affixed on the lower end of piston rod 45. Thus vertical reciprocation of piston 44 raises and lowers block 55, and through the mechanism of toggle linkage 46, in which links 51 and 53 are drawn inwardly by links 54 in the upper position (see Figures 2 and 3) and pushed out almost to a straight vertical line in the lower position (see Figures 1 and 4).

On its upper surface abutment 40 carries the lower half 61 of the mold 60. Similarly sliding platen 50 on its undersurface carries the upper half 62 of mold 60. The size of mold halves 61 and 62 is designed such that they can be brought into abutting contact when piston 44 is almost at its lowest vertical position at which toggle linkage 46 is in its most advantageous position for exerting downward force.

Lower mold half 61 (see also Figure 5) includes a centrally apertured base 63 secured on abutment 40. Above base 63 is secured a cooling plate 64 provided with internal passages 65 through which a coolant can circulate in the conventional manner. Above cooling plate 64 is secured a die plate 66. Die plate 66 has in its upper surface several die cavities 67 in which the molded parts are to be formed (see also Figure 13). At its rear end (right in Figure 5) die plate 66 is provided with a vertical bore 68 which receives the tip 69 of right-angled injection nozzle 70. Nozzle 70 is provided with a central vertical passage 71 having a restricted upper portion 72 opening into the face of die plate 66. Passage 71 communicates at its lower end with a horizontal passage 73 which communicates with the interior of heating chamber 27.

Upper mold half 62 is provided with a centrally apertured base 75 secured to the underside of sliding platen 50. Beneath base 75 there is attached a cooling plate 76 which is also provided with central passages 77 through which a coolant can be circulated. Attached beneath cooling plate 76 is a die plate 78, the lower surface of which abuts the upper surface of die plate 66 when press mechanism 22 is in closed position.

The undersurface of die plate 78 is provided with runner channels 79 (see also Figure 14) which lead from a position confronting the opening of vertical passage 72 at the interface between die plates 66 and 78 to positions adjacent the various die cavities 67 in die plate 66. Gates 80 from runners 79 lead to die cavities 67 in pairs and are restricted in cross-section to provide frangible gate portions in the molded piece. Immediately adjacent the outer end of each gate 80 a pair of forces 81 are formed on the underside of die plate 78. Forces 81 are received by die cavities 67 when mold 60 is closed to form between them the molded parts.

Positioned within centrally apertured base 63 is a yoke 85 supported on slide rods 86 which extend downwardly through abutment 40 and terminate in a yoke 87. Yoke 87 is carried on the upper end of a piston rod 88 which at its lower end is affixed in a piston 89 vertically reciprocable in a double-action, hydraulic cylinder 90 mounted on a plate 91 supported beneath abutment 40 on four tie rods 92, the forward pair of which are slidably received by yoke 87. Yoke 85 carries above it vertical ejection pins 93 which slidably extend through base 63, cooling plate 64 and die plate 66 and enter die cavities 67. The upper ends 94 of ejection pins 93 are provided with undercuts 95 such that the molded part in each die cavity 67 can be retained by ejection pins 93 within die cavity 67 as the mold is opened to degate the molded parts from the cull in runner channels 79. The length of pins 93 is such that as yoke 85 is reciprocated vertically they can be raised out of die cavities 67 to lift the molded parts above the upper surface of die plate 66.

A yoke 100 is similarly positioned within centrally apertured base 75. Yoke 100 is supported on a pair of slide rods 101 which extend upwardly through sliding platen 50. At its upper end each slide rod 101 is provided with rack teeth 102 which engage one of a pair of elongated pinions 103, each mounted in a separate block 104 for rotational movement about a horizontal axis (see also Figures 2 and 3). Each block 104 is mounted between platen 50 and cross head 42 on the opposite side of press mechanism 22 from the other and is slidably received on the pair of tie rods 41 located on its respective side of press mechanism 22. Additional slide rods 105, affixed at their lower ends in yoke 87, are slidably passed through abutment 40, extend upwardly about the sides of mold 60 and platen 50 and are slidably received in a block 104. Slide rods 105 at their upper ends are provided with rack teeth 106 which engage pinions 103 opposing the engagement of slide rods 101.

A series of ejection pins 110 are secured in vertical position to the undersurface to yoke 100 and extend downwardly through base 75, cooling plate 76 and die plate 78 projecting into the interior of runner channels 79 in die plate 78. The tips 111 of pins 110 which project into runner channels 79 are each provided with an undercut 112 which when injected material is solidified in channels 79 is used to assist in drawing the cull thus formed away with die plate 78 when mold 60 is opened.

Mounted on a plate 115 supported beneath abutment 40 on four tie rods 116 is a double-action, hydraulic cylinder 117. Cylinder 117 is provided with a vertically reciprocable piston 118 which carries a piston rod 119 on the outer end of which is secured a yoke 120. Yoke 120 supports two slide rods 121 which extend upwardly through abutment 40 along the rear of lower mold half 61 and terminate in a yoke 122. Yoke 122 carries a vertical pin 123 which extends upwardly through yoke 122 into right angle nozzle 70 and into passage 71. The length of pin 123 is such that pin 123 can be retracted into the enlarged portion of passage 71, or it can be extended through the restricted portion 72 and when mold 60 is opened, extended therefrom to assist in knockout and ejection functions.

Mounted above injection mechanism 21, but lower than hopper 23 in vertically spaced relationship are a comb 125, a tray 126 and a comb 127 (see also Figure 12). Comb 125 is provided with open ended parallel slots 128 which are aligned with pins 93 such that horizontal movement of comb 125 from above injection mechanism 21 into the open mold 60 permits comb 125 to straddle pins 93 when the latter are extended above die plate 66. Tray 126 is positioned above comb 125 such that it can be moved into mold 60 when open, and comb 127 is provided with open ended parallel slots 129 which are aligned with ejection pins 110 such that horizontal movement of comb 127 above tray 126 into open mold 60 permits comb 127 to straddle pins 110.

Combs 125 and 127 and tray 126 are suitably mounted in guide tracks (not shown) to facilitate such horizontal movement. At their rear ends (right in Figure 12) combs 125 and 127 are secured together in a horizontal frame 130 which is affixed to the inner ends of a pair of slide rods 131 which are horizontally and slidably received by an abutment 132 forming a portion of the frame of press 20 and which supports heating chamber 27. At their outer ends rods 131 terminate in a frame member 133 to which is secured the outer end of a piston rod 134 carried by piston 135 which is horizontally reciprocable in a double-action cylinder 136 mounted above injection mechanism 21 between abutments 132 and 36. Tray 126 is similarly affixed at its rear end in a horizontal frame member 137 which at its ends is secured to a pair of upright brackets 138, each carried on the inner end of a slide rod 139 horizontally and slidably received by abutment 132. Each slide rod 139 terminates at its outer end in a frame member 140 disposed beneath frame member 133 and similarly affixed to a piston rod 141 which is carried by a piston 142 horizontally reciprocable in a double-action cylinder 143 mounted above injection mechanism 21 between abutments 132 and 36.

Mounted on frame member 137 and projecting rearwardly through abutment 132 is a third double-action cylinder 144 in which a piston 145 is horizontally reciprocable. Piston 145 carries a piston rod 146 on the outer end of which is secured a scraper blade 147 positioned transversely of the face of tray 126. A second scraper blade 148, positioned transversely of the face of comb 125 is attached to and carried by blade 147. By such arrangement reciprocation of piston 145 can cause blade 147 to sweep tray 126 from the rear to the forward end while, simultaneously, blade 148 sweeps comb 125 from the rear to the forward end.

Press 20 is provided with suitable automatic controls for governing the operation of the various elements in the sequence hereinafter described. Of course manual operation can optionally be provided.

In operation starting with mold 60 in closed position as illustrated in Figure 5, with hopper 23 loaded with granular thermoplastic molding material and with injection mechanism 21 charged and under pressure, it will be noted that upper mold half 62 is closed upon lower mold half 61 with die (i.e. force) plate 78 abutting die plate 66 with forces 81 received by die cavities 67. Ejection pins 93 and 110 are retracted such that the tips 111 of pins 110 extend partially into runner channels 79, exposing undercuts 112, and such that the tips 94 of ejection pins 93 are extended partially into die cavities 67 to expose undercut portions 95. Nozzle valve pin 123 is extended to a position in which its tip is flush with the opening of vertical passage 72 into runner channels 79. Combs 125 and 127 and tray 126 are, of course, withdrawn from mold 60.

The hydraulic fluid connections to cylinder 117 are reversed causing piston 118 to drop thus lowering pin 123 into the enlarged portion of vertical passage 71 (see Figure 6). The pressure exerted upon the fluent, heated thermoplastic material confined in heating chamber 27 by ram 33 immediately causes the fluent material to flow through passages 73, 71 and 72 into runner channels 79, through gates 80 into the spaces between forces 81 and cavities 67. Ram 33 moves forward in chamber 27 during injection. Piston 118 is then reciprocated upwardly by reversing the hydraulic connections to cylinder 117 and pin 123 is returned into the restricted portion 72 of passage 71 with its tip flush with the opening of passage 72 into runner channels 79 closing communication with heating chamber 27 (see Figure 7). The entire open time of valve pin 123 requires only a fraction of a second.

While the injected material remains between the closed mold halves 61 and 62 and is cooled by flowing coolant through passages 65 and 77 in plates 64 and 76, the connections to hydraulic cylinder 30 are reversed causing piston 31 to move to the rear thereby drawing ram 33 and feed piston 37 rearwardly. With this motion a charge from vertical passage 26 falls into the rear end of heating chamber 27. Immediately the hydraulic fluid connections to cylinder 30 are again reversed and piston 31 moves forward pushing feed piston 37 forward in feed chamber 24 to force a fresh charge of pulverulent molding material from chamber 24 into vertical passage 26 and to close passage 25. Simultaneously ram 33 stuffs the charge of molding material in heating chamber 27. The connections to hydraulic cylinder 30 thereafter are again reversed and the stuffing action repeated, again and again until heating chamber 27 is fully reloaded. The material in chamber 27 is thus heated and worked by pressure of ram 33 so that it is in a fluent readily injectable form before valve pin 123 is again opened during a succeeding operational cycle.

In the meantime mold 60 remains closed until a suitable timing cycle for proper curing elapses at which time the cull in runner channels 79 and the molded parts between forces 81 and cavities 67 have solidified in a single piece.

When the timing cycle for setting the molded pieces is completed, the hydraulic connections to cylinder 43 are reversed withdrawing piston 44 upwardly causing toggle linkage 46 to bend inwardly drawing sliding platen 50 upward on slide rods 41 and breaking upper mold half 62 from lower mold half 61. This action causes the culls in runner channels 79 to separate from the molded parts in die cavities 67 by breaking at their weak gate portions formed in gates 80 since the culls are retained in channels 79 by undercuts 112 and since the molded parts are retained in cavities 67 by undercuts 95. The upward movement of sliding platen 50 does not affect the relative position of upper ejection pins 110 because of the compensating reaction of opposing racks 102 and 106 about pinions 103 (see Figure 2).

As mold 60 is opened, cylinder 143 is connected to cause piston 142 to drive tray 126 into the mold space (see Figure 8).

The hydraulic connections to cylinder 90 are then reversed driving slide rods 86 and slide rods 105 upwardly. The engagement of rack teeth 106 on rods 105 rotates pinion 103, which engages rack teeth 102 in a manner driving slide rods 101 downwardly simultaneously with the upward movement of slide rods 86. Thus both yoke 85 and yoke 100 are simultaneously advanced toward each other carrying ejection pins 93 upwardly and ejection pins 110 downwardly. The downward movement of pins 110 forces the culls from runners 79, and the upward movement of pins 93 raises the molded parts from die cavities 67. Cylinder 136 is then connected to advance piston 135 and consequently drives combs 125 and 126 into the mold space, straddling pins 93 and 110 which are received by slots 128 and 129, respectively (see Figure 9).

Figure 10:
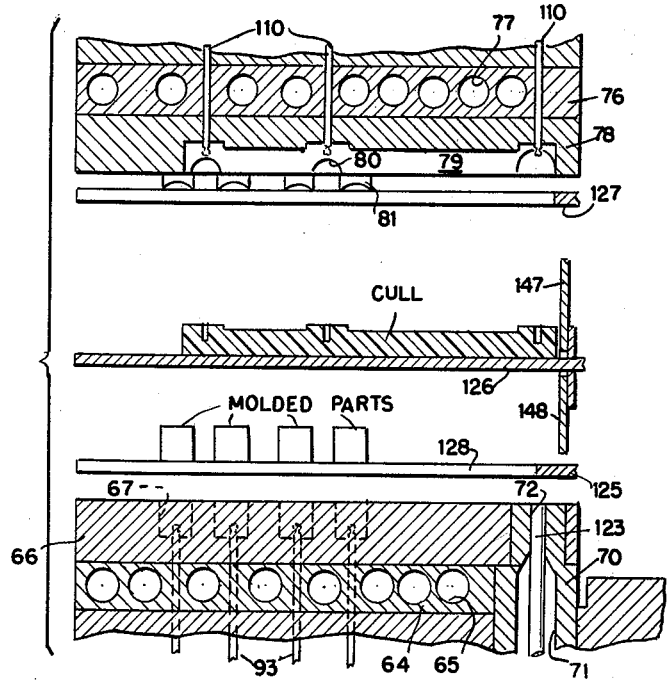
Figure 10 is a view similar to Figure 5 illustrating separate collection of the ejected parts and cull.

The hydraulic connections of cylinder 90 are then reversed and ejection pins 93 and 110 thereupon retracted. Such retraction of pins 93 and 110 through slots 128 and 129 of combs 125 and 127, respectively, clears upper ejection pins 110 of the culls and causes the molded parts to be released from pins 93. Thereupon the culls are collected in tray 126 and the molded parts are separately collected on comb 125 (see Figure 10).

Figure 11:
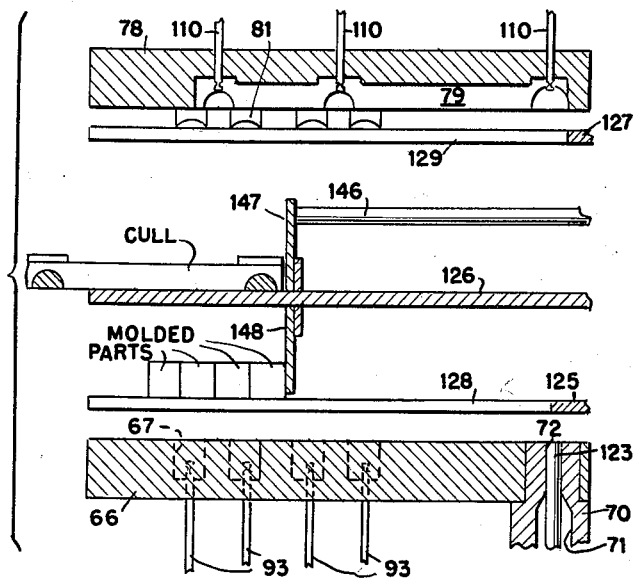
Figure 11 is a view similar to Figure 5 illustrating removal of the collected parts and cull.

Thereafter cylinder 144 is connected to force blades 148 and 147 to traverse comb 125 and tray 126 sweeping the molded parts from comb 125 onto a suitable conveyor and the culls from tray 126 into a suitable chute, thereby accomplishing ejection of the parts from mold space while simultaneously separating culls from parts (see Figure 11).

Cylinders 136, 143 and 144 are then reversed, thus retracting comb 125, tray 126, comb 127, blade 147 and blade 148 from the mold space. The hydraulic connections of cylinder 43 are then reversed causing upper mold half 62 to descend bringing force plate 78 into abutting contact with die plate 66 whereupon the molding cycle is repeated as described above.

I claim:

1. An injection molding press which comprises a pair of relatively movable mold members having confronting faces defining between them a molding cavity including a die cavity in one said mold member in which a molded piece is to be formed and a runner channel in the other said mold member, means for cooling said mold members, means for moving said mold members from closed position in which said confronting faces abut each other and in which said runner channel and die cavity connect with each other to an open position in which said confronting faces are relatively separated, injection means connected to said runner channel for injecting molding material through said runner channel into said die cavity, ejection pins reciprocable through each of said mold members, means for separating a cull of solidified molding material formed in said runner channel from a molded piece in said die cavity upon movement of said mold members from said closed to said open position, a pair of combs reciprocable into the space between said mold members when said mold members are in open position, each said comb being positioned to straddle said ejection pins associated with a said mold member, a tray reciprocable into the space between said mold members and between said combs when said mold members are in open position, means for extending said pins through said confronting faces of said mold members when said mold members are in open position, and means for moving said combs and said tray into the space between said mold members when said mold members are in open position.

2. An injection molding press which comprises a pair of relatively movable mold members having confronting faces defining between them a molding cavity for formation on a molded piece, means for cooling said mold members, means for moving said mold members from a closed position in which said confronting faces abut each other to an open position in which said confronting faces are relatively separated, injection means including a material receiving chamber, means for heating said chamber, an injection ram reciprocable in said chamber, a nozzle leading from said heating chamber into said mold members in communication with said cavity, a valve in said nozzle, means for withdrawing and returning said ram in said chamber to receive and apply pressure to a charge of fresh solid molding material therein, said valve being operable to open position when said mold members are closed and said ram is in said chamber applying pressure to material therein and to closed position immediately upon the resultant injection of material from said chamber into said mold, said last named means being operable upon such closure of said valve and while said material injected into said mold cavity is still fluent and said mold members are closed, the molding cavity defined between the confronting faces of said mold members including a die cavity in one said mold member in which said molded piece is to be formed and a runner channel in the other said mold member providing the said communication between said nozzle and said molding cavity, ejection pins reciprocable through each of said mold members, means for separating a cull of solidified molding material formed in said runner channel from a molded piece formed in said die cavity upon movement of said mold members from said closed to said open position, a pair of combs reciprocable into the space between said mold members when said mold members are in open position, each said comb being positioned to straddle said ejection pins, a tray reciprocable into the space between said mold members and between said combs when said mold members are in open position, means for extending said pins through said confronting faces of said mold members when said mold members are in open position, and means for moving said combs and said tray into the space between said mold members when said mold members are in open position.

References Cited in the file of this patent

UNITED STATES PATENTS

| 2,318,031 | Tucker | May 4, 1943 |
| 2,568,771 | Smith | Sept. 25, 1951 |
| 2,582,891 | Strauss | Jan. 15, 1952 |
| 2,770,011 | Kelly | Nov. 13, 1956 |